(12) United States Patent
Ricks et al.

(10) Patent No.: US 7,463,217 B2
(45) Date of Patent: Dec. 9, 2008

(54) SCROLLING ELECTRONIC SIGNAGE

(75) Inventors: Theodore K. Ricks, Rochester, NY (US); David M. Johnson, West Henrietta, NY (US)

(73) Assignee: Industrial Technology Research Institute, Hsinchu (TW)

( * ) Notice: Subject to any disclaimer, the term of this patent is extended or adjusted under 35 U.S.C. 154(b) by 475 days.

(21) Appl. No.: 11/021,765

(22) Filed: Dec. 21, 2004

(65) Prior Publication Data

US 2006/0132429 A1 Jun. 22, 2006

(51) Int. Cl.
*G09G 3/20* (2006.01)

(52) U.S. Cl. ............................. 345/55; 345/60; 345/107; 345/1.1

(58) Field of Classification Search .................. 345/173, 345/55, 60, 107, 1.1
See application file for complete search history.

(56) References Cited

U.S. PATENT DOCUMENTS

| | | | | |
|---|---|---|---|---|
| 5,723,204 | A | * | 3/1998 | Stefik .......................... 428/206 |
| 6,269,225 | B1 | | 7/2001 | Sato et al. |
| 6,424,387 | B2 | | 7/2002 | Sato et al. |
| 6,473,072 | B1 | * | 10/2002 | Comiskey et al. ........... 345/173 |
| 6,498,597 | B1 | | 12/2002 | Sawano |
| 6,603,457 | B1 | * | 8/2003 | Nakanishi .................... 345/107 |
| 2003/0071800 | A1 | | 4/2003 | Vincent et al. |
| 2004/0212582 | A1 | * | 10/2004 | Thielemans et al. ......... 345/107 |

FOREIGN PATENT DOCUMENTS

EP 0 997 837 5/2000

* cited by examiner

*Primary Examiner*—Richard Hjerpe
*Assistant Examiner*—Leonid Shapiro
(74) *Attorney, Agent, or Firm*—Alston & Bird LLP (57) ABSTRACT

A display, a signage system including the display, and methods of writing the display, are described, wherein the system includes at least one looped scroll of bistable display media and at least one electronic writehead. The entire display can be written by using the writehead to address individual sections of the display media by moving the writehead relative to the media.

28 Claims, 7 Drawing Sheets

SCROLLING ELECTRONIC SIGNAGE

FIELD OF THE INVENTION

The present invention relates to an electronically updatable, scrolling bistable display, and signage systems including such displays.

BACKGROUND OF THE INVENTION

Electronic signs are becoming popular in retail stores in order to keep pricing and sale information as current as possible. For example, prices can be kept up-to-date without having to reprint new price sheets whenever there is a sale or price change. The customer benefits by having the up-to-date information they need about the product pricing, and the retailer benefits by having programmable information that can be readily changed by various electronic means.

In the past, the challenge of electronic signs was addressed through the use of traditional display technologies, such as cathode ray tubes (CRTs), liquid crystal displays (LCDs), or plasma displays. These technologies provide dynamic, video-capable imagery, but in return require complex, expensive electronics and constant power. The advent of bistable display technologies has enabled a new breed of electronic sign, which utilizes an electronic "printhead" that is capable of updating display media as it moves past the head. This enables signage to be made with both reduced electronics and power consumption, and completely unique form factors.

One example of an electronic sign as discussed above is described in U.S. Pat. No. 6,269,225, to Sato et al., which discloses an electronically programmable display screen that is extendable. In U.S. Pat. No. 6,424,387, Sato et al. refine this idea to include a "feed-through" form of the design, wherein the display media can be ejected from one of two ports in the writehead. This format enables an optional display media design, in which the display has two symmetric writeable sections, one on each side of the media, so that the display can be viewed regardless of from which port it ejects.

Another example of an electronic sign is described in U.S. Pat. No. 6,498,597 to Sato et al., which discloses another system with an extendable, flexible display, but additionally proposes the use of a take-up spool to enable scrolling of long displays.

An alternative display system is set forth in U.S. Patent Application Publication No. US2003/0071800A1 to Vincent et al., wherein the display can be pulled out from and reinserted into the writehead to display one page of a book at a time.

One problem with the signage systems described above is the limitations in view direction of the displayed image. If reflective media is used, then the image is only viewable from one side. If transmissive media is used, the image can be viewed from either side, but it will be reversed, or mirror image, from one viewing direction. In either case, the display media is limited to a simple, two-dimensional display area, readable from only one viewing direction. Another problem with the above-described systems is that the writehead must have a sensing mechanism to recognize the end of the media to prevent overdriving that can damage the media or writehead.

There is a need for a bistable signage system, which has the reduced electronics and power requirements of existing bistable systems, yet is also capable of being viewed from multiple directions, and is not subject to failures due to overdriving.

SUMMARY OF THE INVENTION

An electronically updatable, bistable display and a method of writing the display, are described, wherein the display comprises a loop of bistable material having a view side with at least one viewable area, and a second side, and a writehead adjacent an area of the bistable material, wherein the loop of bistable material is movable relative to the writehead.

ADVANTAGES

The electronically updatable, bistable display provides inexpensive signage that can be used to display messages to one or more view directions simultaneously or in sequence. The system enables the displays to be partially or completely written, without fear of damaging media electronics due to overdriving. Additionally, the media can be configured in a multitude of different arrangements with no change required in the writing hardware. The system is less expensive than other electronic signage systems, is easy to operate, and uses minimal power.

BRIEF DESCRIPTION OF THE DRAWINGS

The invention as described herein can be understood with reference to the accompanying drawings as described below.

The drawings are exemplary only, and depict various embodiments of the invention. Other embodiments will be apparent to those skilled in the art upon review of the accompanying text.

DETAILED DESCRIPTION OF THE INVENTION

An electronic, rewritable display can be used in a signage system. The display can have one or more looped sheets of display media, which are electronically addressable using one or more electronic writehead. The display media and writehead can move relative to each other. The information written to the display media can be viewed from one or more view directions. The media loop axis can be oriented in any direction relative to the viewer, for example, horizontal, vertical, or angled.

The display media can be a rewritable, electronic display element. According to various embodiments, the display element can maintain a desired written message without power. Such display elements can include a bistable material, for example, electrochemical materials; electrophoretic materials, including those manufactured by Gyricon, LLC of Ann Arbor, Mich., and E-ink Corporation of Cambridge, Mass.; electrochromic materials; magnetic materials; and liquid crystal materials. The liquid crystal materials can be chiral nematic liquid crystal materials. Chiral nematic liquid crystals can be polymer dispersed liquid crystals (PDLC). Suitable chiral nematic liquid crystal materials include a cholesteric liquid crystal disclosed in U.S. Pat. No. 5,695,682, and Merck BL112, BL118, and BL126, all available from EM Industries of Hawthorne, N.Y.

The display element including a bistable material can be formed by methods known in that art of display making. Wherein the bistable material is liquid crystal material, a support having a first conductive layer can be coated with the bistable material or a pre-formed layer of the bistable material can be placed over the first conductive layer. A second conductive layer can be formed over the bistable material to provide for application of electric fields of various intensity and duration to the bistable material to change its state from a reflective state to a transmissive state, or vice versa. The bistable materials can maintain a given state indefinitely after the electric field is removed. According to various embodiments, one or more conductive layer can be provided external to the bistable media.

The first conductive layer can be patterned into parallel lines. The second conductive layer can be patterned non-parallel to the patterning of the first conductive layer such that the intersection of the first conductive layer and the second conductive layer forms a pixel. The bistable material in the pixel changes state when an electric field is applied between the first and second conductive layers. Alternatively, the second conductor can be patterned into the shape of individual pixels, while the first conductor is in sheet form.

The second conductive layer can be electrically conductive segments formed over the bistable material layer by thick film printing, sputter coating, or other printing or coating means. The conductive segments can be any known aqueous conductive material, for example, carbon, graphite, or silver. An exemplary material is Electrodag 423SS screen printable electrical conductive material from Acheson Industries of Port Huron, Mich. The conductive segments can be arranged to form pixels of any shape, numbers 0-9, a slash, a decimal point, a dollar sign, a cent sign, or any other character or symbol.

The optical state of the bistable material between the first conductive layer and the second conductive layer can be changed by selectively applying an electrical drive signal across the bistable material between the first and second conductors. This signal can be a voltage, current, or any combination therein. The signal can be applied to the second conductive layer, the first conductive layer, or both, by direct or indirect contact, if they are present in the media. For any conductive layer not present in the media, the signal can be applied to selected areas of the bistable material through direct or indirect contact of one or more external electrode to the bistable material. Once the optical state of the bistable material has been changed, it can remain in that state indefinitely without further power being applied to the conductive layers. Methods of forming various bistable display elements are known to practitioners in the art, and are taught, for example, in U.S. Ser. No. 10/134,185, filed Apr. 29, 2002 by Stephenson et al., and in U.S. Ser. No. 10/851,440, filed May 21, 2004, by Burberry et al.

A desired image can be formed on the display media by selectively changing the optical state of individual areas of the display media. This can be accomplished by passing the display media past one or more electrodes, hereafter referred to as the "writehead," which is designed to interact with the display media to apply the appropriate drive signal to change selected areas of the display media. A writehead can include one or more electrode. The display media and writehead can move relative to each another, which allows the image to be formed over a larger area than that which is covered by the writehead. The writehead can be sized to cover one dimension of the display media, for example, the width. Alternately, two or more writeheads can be used together to cover the width of the media.

The display media can be positioned relative to the writehead, such that the writehead aligns with a desired area to be written on the display. The alignment may be to a specific location, a fiducial, an aperture, a feature on the first or second conductor, or any other characteristic of the display media. The electrodes can be on the view side, back side, or both sides of the media. The writehead can be predominantly located on the view side, predominantly located on the backside, or located on both sides of the media. The writehead can consist of two separate pieces when the writehead is located on both sides of the media, wherein the pieces move simultaneously relative to the media. The writehead can be placed into direct or indirect contact with the desired location or feature on the media. The writehead can be energized to apply the drive signal through the desired area of the display media, changing the optical state of selected areas of the display media. The media and writehead can be moved relative to each other to allow the writehead to address another section of the media. The media can form a loop, such that the writehead can continuously address it. In this manner, the writehead can address the entire display media, without requiring sensors to detect the beginning and ending of the media loop.

The source of the writehead drive signal can be a circuit board for writing or rewriting the display media. According to certain embodiments, the circuit board can include a power source, such as a battery. According to other embodiments, the circuit board is capable of connection to an external power source, for example, a battery or an electrical circuit. The display drive source can be connected to the writehead physically. The display drive source can be electrically connected to the writehead directly or through some secondary connections, such as wires.

The source of the driving force to impart relative motion between the display media and writehead can be incorporated into the writehead. This can be accomplished through the use of nip rollers, stepping action, or any other means. The drive force can be imposed by outside forces, such as external rollers, manual labor, or any other means, to move the writehead, the display media, or both.

A display including at least one display media loop and at least one writehead can be made. For use in a signage system, the media, writehead, and drive mechanism can be incorporated into an integrated unit. The components can be encapsulated as a single unit, as individual components, in various combinations, or can require no external encapsulation. The encapsulation can provide a path to guide the travel of the media, writehead, or both. The encapsulation can have at least one transparent area or at least one open area for viewing the display.

A signage system can include one or more media loops, at least one writehead, and optionally one or more encapsulating units. Data can be supplied to the signage system from a computer in wired or wireless communication with the writehead.

The display and signage system can be understood with reference to certain embodiments including a cholesteric liquid crystal display element, as depicted in the Figures and described below.

Figure 1:
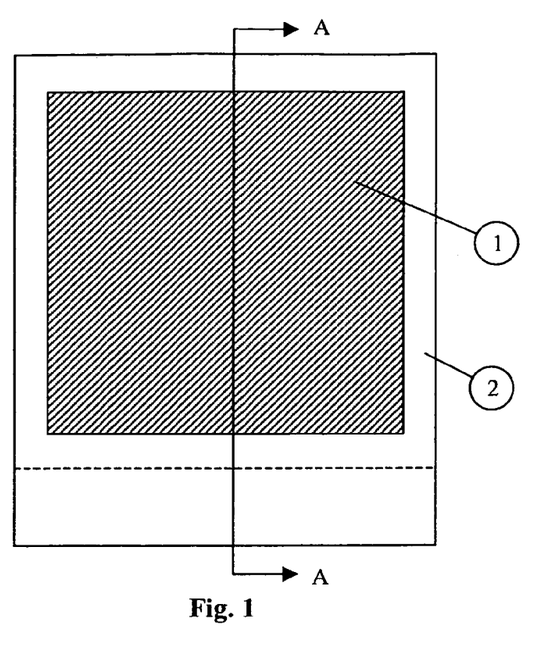
FIG. 1 is a front view of vertically oriented sign.

FIG. 1 is a front view of an electronically addressable, self-contained, reflective sign. The sign has a viewing area 1, through which display media can be seen and a case 2 to provide structure and protection to the display media. In this orientation, the image can be mechanically indexed from top-to-bottom or bottom-to-top relative to the case 2.

Figure 2:
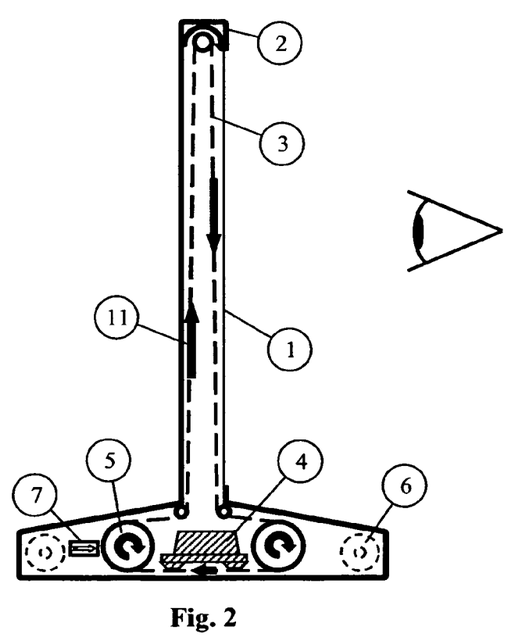
FIG. 2 is a cross-sectional view of a vertically oriented, single-sided, reflective sign.

FIG. 2 is a cross-section of the vertically-oriented sign. The interior of the sign contains an electronically rewritable, bistable, display media 3. The bistable media can be addressed one section at a time by the electronic writehead 4, while maintaining the image on the un-addressed sections of the display. The writehead 4 can be on either side of the display media 3, or can be on both sides of the display media 3. Any form of internal or external electronic source can provide data and signal generation for the writehead 4, for example, a computer.

Once a section of the display media is addressed, the display media 3 can be indexed in the media movement direction 11 to the next section by the media drive mechanism 5. This can be powered rollers, reciprocating drive arms, manual intervention, or any other source of indexing force. The drive mechanism can be incorporated into the writehead 4, or located remotely. The writehead 4 and drive mechanism 5 can be powered by an internal power source such as a battery 6 or by any other source of internal or external power.

The media 3 can be arranged as a looping scroll, such that it can be continuously indexed. In such a case, the starting and ending location of the display image would only have to be controlled relative to the viewing area 1. The system does not require sensors to determine the end of the media 3. The media 3 can be re-written multiple times without requiring the drive mechanism 5 to change media movement direction 11, although the drive mechanism 5 can change media movement direction 11 if desired. The media scroll 3 can be oriented such that the viewable image can be seen from the inside or outside of the scroll. The system can include an optical scanner 7. The scanner 7 can optically view the media one section at a time, and compare it to the intended image to confirm accuracy of the updated information. The scanner 7 can check each written section before, during, or after indexing the media.

Figure 3:
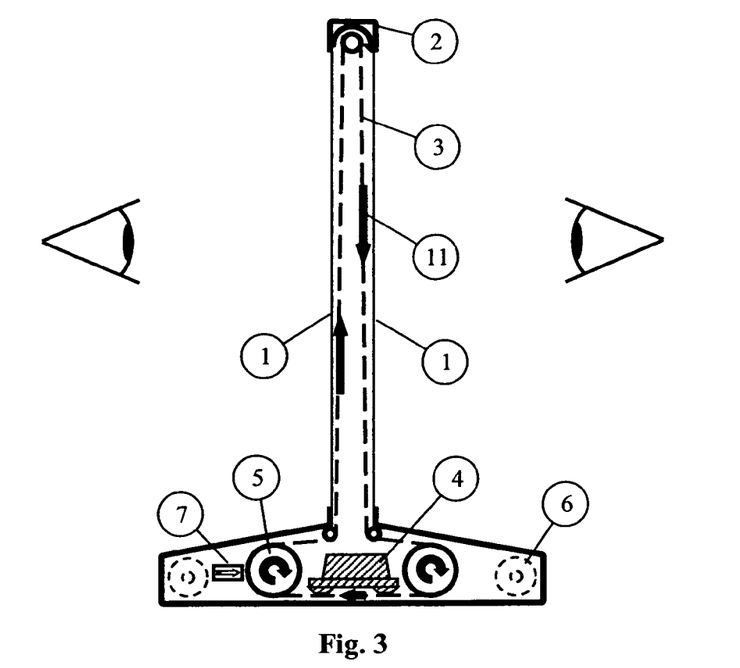
FIG. 3 is a cross sectional view of a vertically oriented, 2-sided reflective sign.

FIG. 3 shows an alternative version of the sign, in which two sides of the media are viewable. Readable text can be written on both sides of the sign by inverting the images relative to each other while writing. One or more optical sensor can be used, preferably one sensor per writehead, to confirm the display is properly written. In this case, an end of the loop of display media can be identified to allow proper indexing of the images, which are written upside down relative to one another, or the display drive data can accurately reflect the positioning of each image. Refreshing of the images in such a display can occur periodically, wherein all images are updated, and the sign ceases scrolling between updates for readability. Alternately, two or more writeheads can be used in the system, for example, one writehead at each end of the loop of display media, such that the display media can be scrolled continuously without a loss in readability to any viewer.

Figure 4:
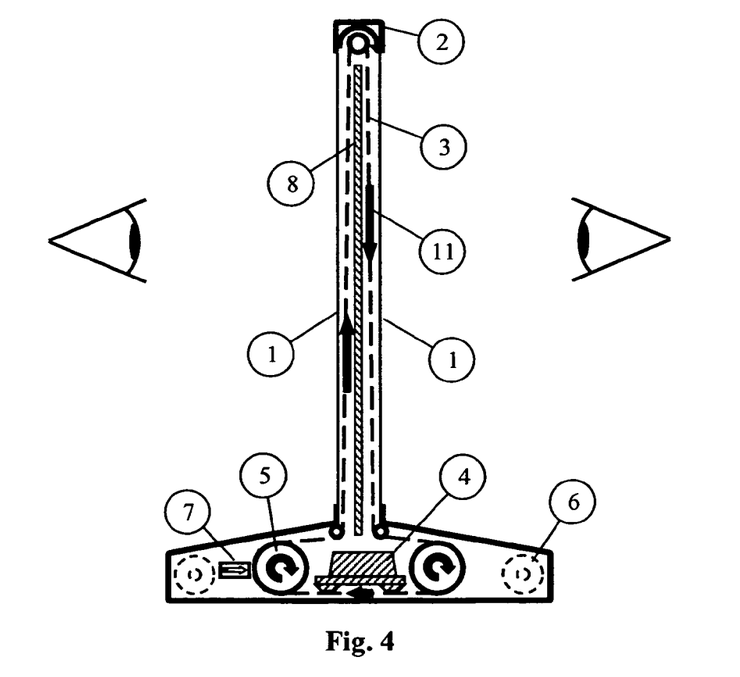
FIG. 4 is a cross sectional view of a vertically oriented, 2-sided transflective sign.

FIG. 4 demonstrates a transflective version of the two-sided sign. The display media 3 can be transmissive when backlit, and reflective when front lit. A single light-source 8 can be placed between the two viewable areas, providing optional backlighting.

Figure 5:
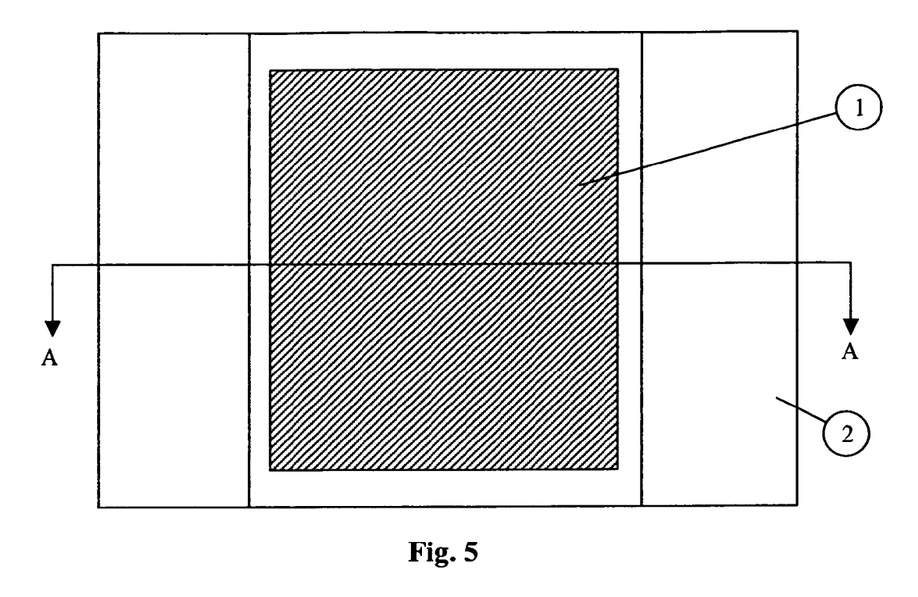
FIG. 5 is a front view of a horizontally oriented sign.

FIG. 5 is a front view of a horizontally oriented sign. In this orientation, the display image in the viewing area 1 can be mechanically indexed from left-to-right or right-to-left relative to the case 2.

Figure 6:
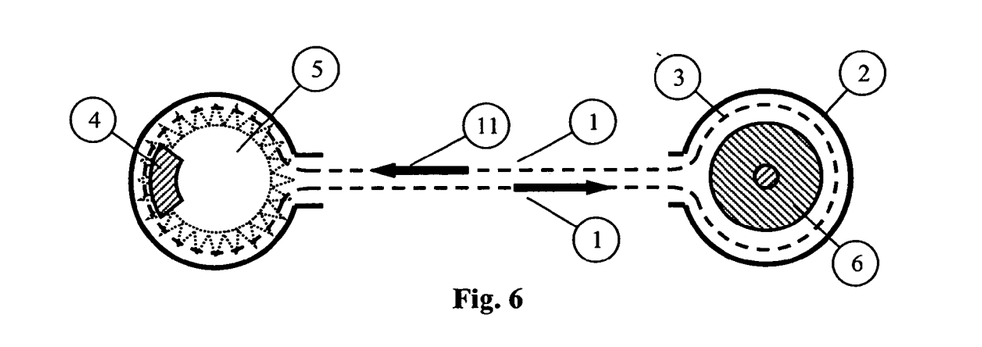
FIG. 6 is a cross-sectional view of a horizontally oriented sign.

FIG. 6 is a cross-sectional view of the horizontally oriented sign. This system can contain the same general components as the vertically oriented sign, and includes the added benefit of having all display images in the same orientation relative to each other. The sign can selectively update one or more areas of the media 3 while maintaining correctly oriented images on some or all of the remainder of the media 3.

Figure 7:
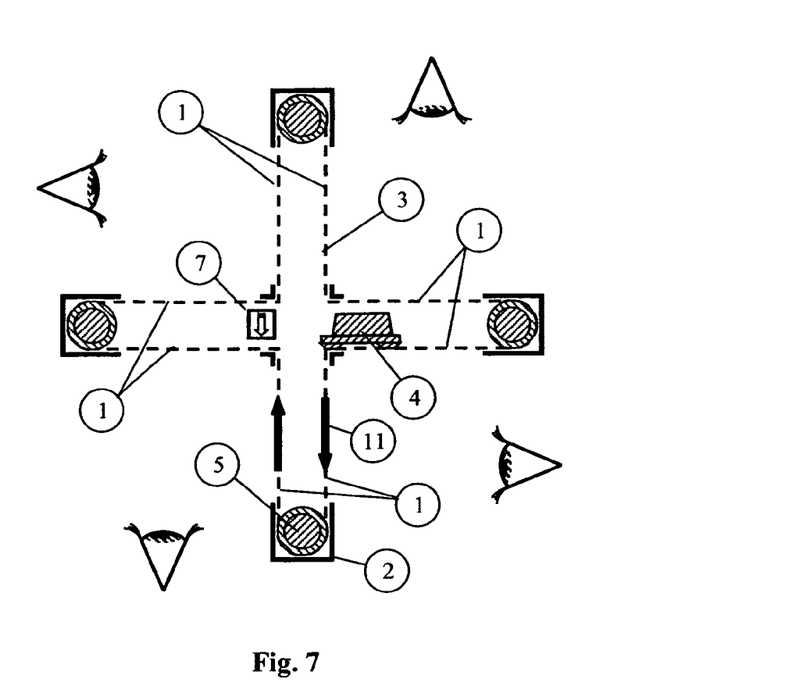
FIG. 7 is a cross-sectional view of a sign with multiple view areas.

FIG. 7 is an example of a display with multiple viewing areas 1. This can be accomplished by using the case 2 and the drive roller or rollers 5 to form the media loop 3 into any desired shape, sections of which are viewable through multiple view areas 1. FIG. 7 demonstrates radial viewing areas 1 which can be accomplished by including multiple switchbacks in the media 3. The display is not limited to radial configurations. Any configuration is possible, limited only by the abilities of the display media to bend or take corners without damage. The media scroll 3 can be arranged into highly complex shapes, which can provide any number of viewable areas 1 at any orientation. For example, the display media can be a continuous freeform loop, viewable from inside or outside, at any point on the loop. If a double-sided media were used, the loop could be viewable from inside and outside at any point, with the exception of the writehead position at any given moment.

Figure 8:
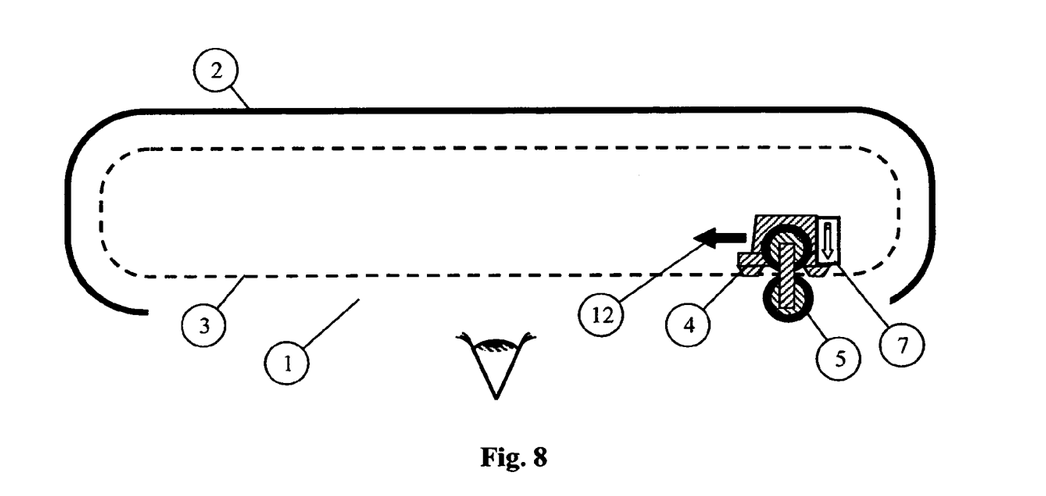
FIG. 8 is a cross-sectional view of a sign with fixed media and a moving writehead.

The signage systems described in this document are not limited to immobile writeheads with indexing media. FIG. 8 shows a system in which the media 3 remains stationary and the writehead 4 moves in the writehead movement direction 12 along the path defined by the scroll. This system can contain all of the same optional components as the previous systems. As with the previously described systems, the display image can be inside the media loop 3, outside of the media loop 3, or both if double-sided display media is used. Optionally, both the writehead 4 and the media 3 can move in opposite directions, at the same or different speeds.

Figure 9:
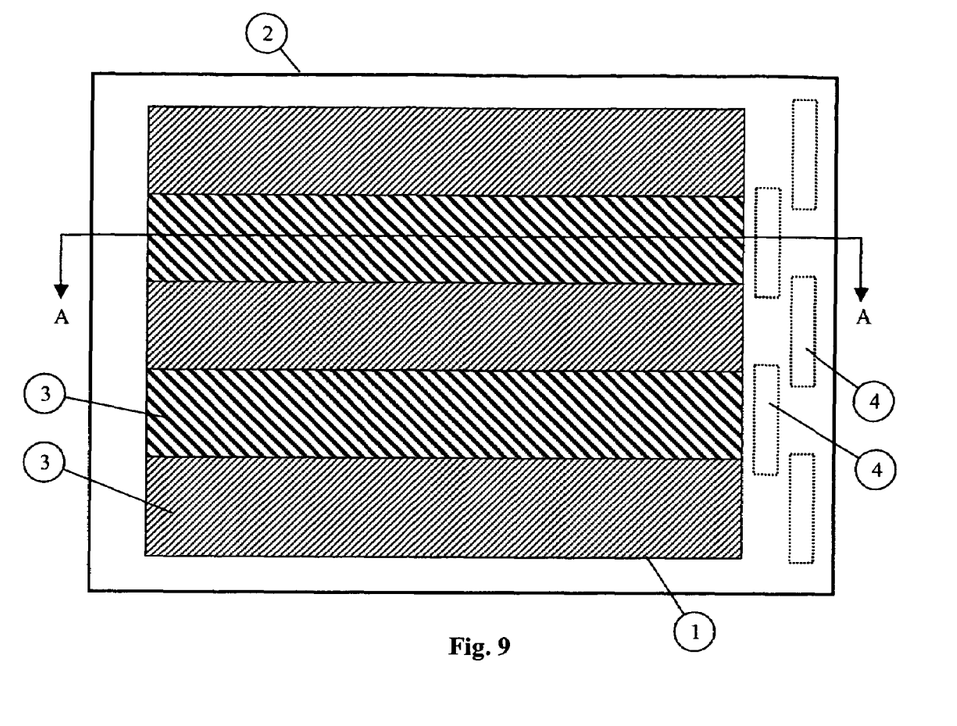
FIG. 9 is a front view of a sign with multiple, horizontally oriented scrolls.

FIG. 9 is a front view of a large display area made up of multiple, individual media scrolls 3, which can be addressed by multiple writeheads 4. The display can be in any orientation, and can include any of the features of the previously described systems.

Figure 10:
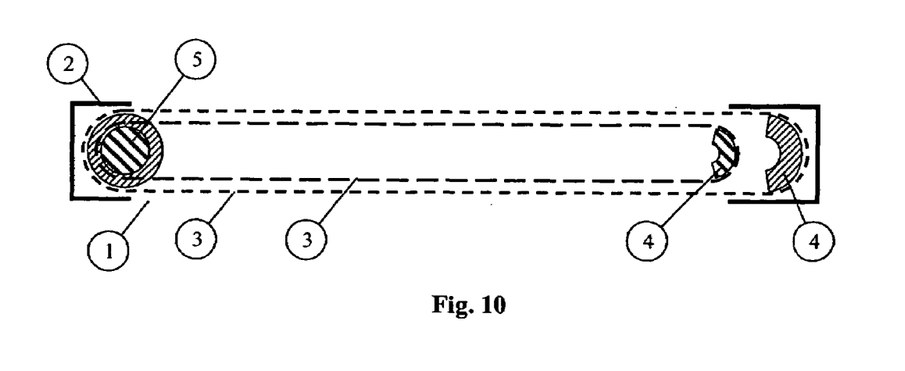
FIG. 10 is a cross-sectional view of a sign with multiple, horizontally oriented scrolls.

FIG. 10 is a cross-sectional view of the multi-scroll system. Signage systems of unlimited display size could be made in this manner, with one dimension, for example, width, controlled by the length of the media scrolls 3, and the other dimension, for example, height, controlled by the width of the media scrolls 3 and the number of writeheads 4. Media scrolls 3 can be in close contact, or can have sufficient clearance to allow for movement of the media, writehead, or both, or for the mechanism of the writehead. In such a multi-scroll system, one or more writeheads 4 can be used to service multiple media scrolls 3 simultaneously. For example, a writehead can be formed to write the width of more than one scroll, thereby reducing the number of writeheads needed.

Figure 11A:
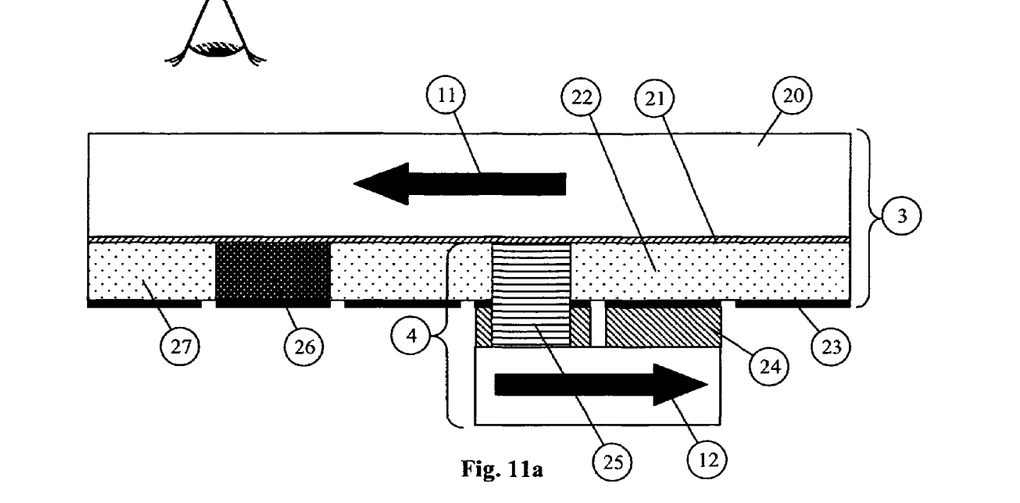
FIG. 11a is a detailed view of media with integral first and second electrodes and an associated writehead.

FIGS. 11a-d show some examples of possible constructions of the media 3 and associated writehead 4. FIG. 11a shows a configuration of the media structure, including a transparent substrate 20 on which can be coated a transparent, first conductor 21, a bistable display material 22, and a second conductor 23. The intersecting areas of the second conductor 23 and first conductor 21 can define the display pixels. For example, the first conductor 21 can be patterned into "rows" oriented in one direction, and the second conductor 23 can be patterned into "columns" oriented in a different, non-parallel direction relative to the first conductor 21. Applying a specific electrical signal to selected rows and columns will set the optical state of overlapping areas to either a first optical state 26 (bright) or a second optical state 27 (dark). A second example of pixel definition is to leave the first conductor unpatterned, and pattern the second conductor 23 into the desired shape of one or more individual pixels. Other methods of defining pixels using two conductors are also acceptable. The media 3 can include additional functional layers not shown in the figure, such as a dark layer, alignment layers, one or more protective layer, or other layers known in the art.

The writehead 4 assembly can include one or more first electrodes 25 that can contact the first conductor 21 on the media 3, and one or more second electrodes 24 that can contact the second conductor 23 on the media 3. To change optical state on a section of the media 3, at least a portion of the second 24 and first 25 electrodes on the writehead 4 can be placed into electrical contact with at least a portion of the second 23 and first 21 conductors of the media 3, and an electrical drive signal can be applied via the writehead 4. The pixels defined on the media by the aforementioned methods can be set to either a first 26 or second 27 optical state. By this means, an image can be defined on the media.

Figure 11B:
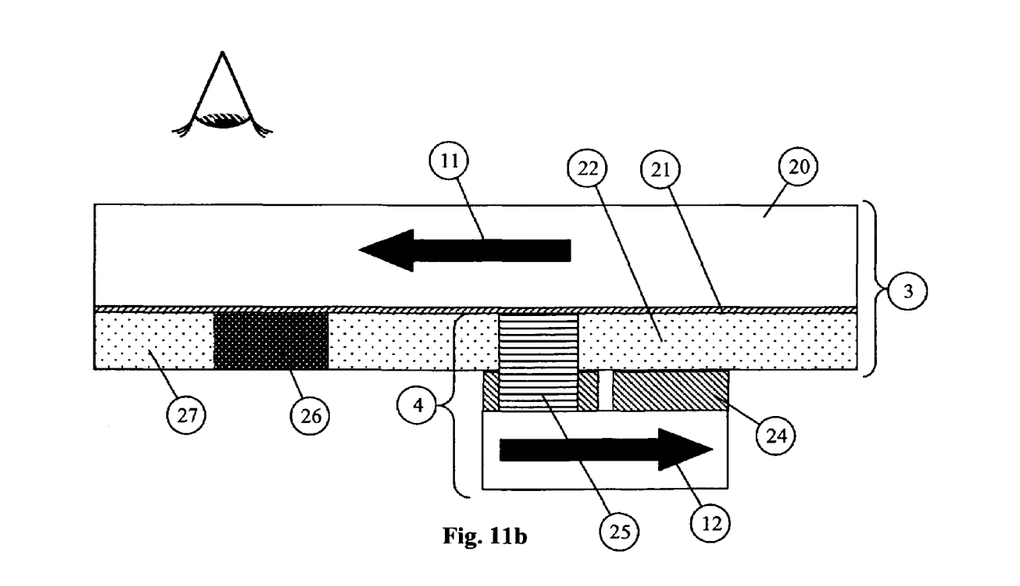
FIG. 11b is a detailed view of media with integral first electrodes only, and an associated writehead.

FIG. 11b shows an alternate construction of media 3, in which the second conductor is not included in the media assembly 3. The writehead second electrode 24 can come into intimate contact with the display material 22, and the area overlapped by the second electrode 24 and the first conductor 21 can define the pixel.

Figure 11C:
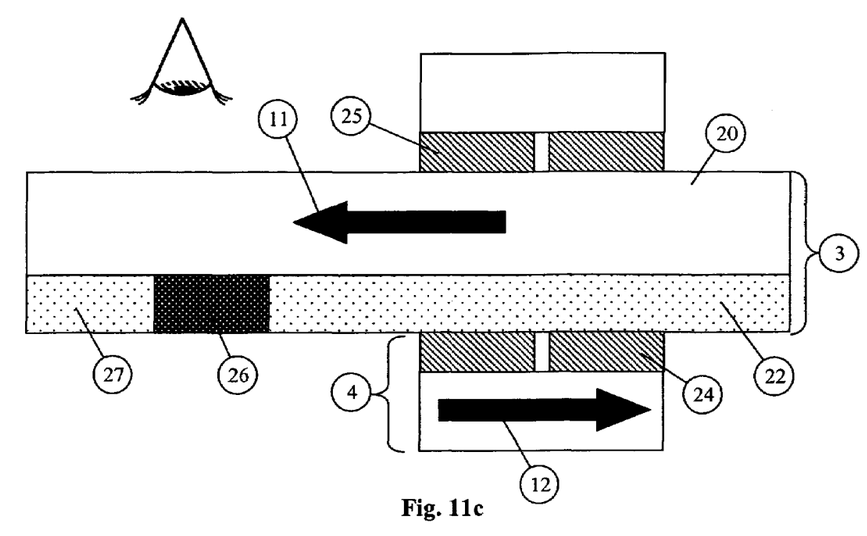
FIG. 11c is a detailed view of media with no integral electrodes and an associated writehead.

FIG. 11c shows a third construction, in which the media includes no integral conductors, and the overlapping areas of the second 24 and first 25 electrodes of the writehead can define the pixels. The writehead can be in one piece, or two pieces that index the media simultaneously.

Figure 11D:
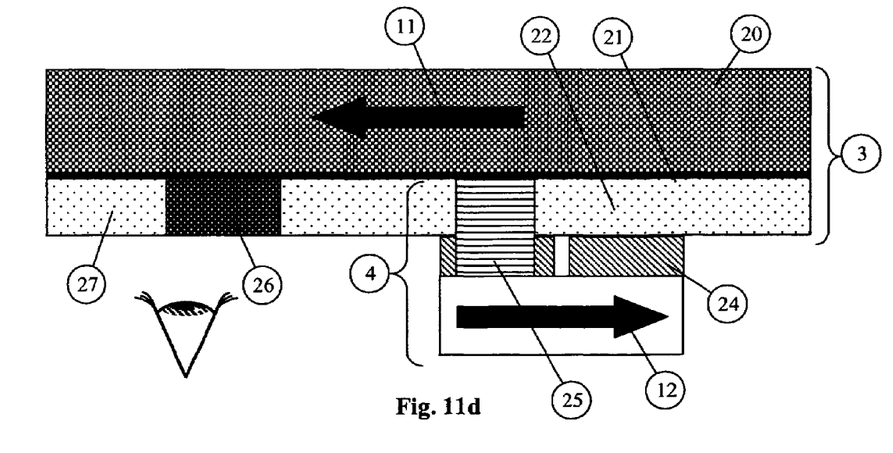
FIG. 11d is a detailed view of backside addressable media and an associated writehead.

FIG. 11d shows a forth configuration, in which the media 3 is not viewed through the substrate. The media conductors and writehead electrodes can be arrayed as described in any of the previous constructions, but the substrate 20 and first conductor 21, if present in the media, can be opaque, and the second conductor 23, if present in the media, can be transparent.

Many configurations of media and writehead have been presented. A media scroll and writehead can be combined in any manner to achieve the desired effect. For example, a single media scroll may have one or more writeheads, wherein the media, the writeheads, or both move. Multiple media scrolls can be combined to form a larger display, wherein each scroll has one or more writehead, each writehead can write to at least one scroll, or a combination thereof.

For simplicity of design, it is desirable that any movement be in one direction, clockwise or counterclockwise, with respect to the media loop. However, it is possible, and sometimes desirable, to write to only a portion of the display, requiring movement of the media, writehead, or both, in both directions. For example, if only one side of a multiple-sided sign requires rewriting, that portion of the sign can be moved past the writehead for writing, and the direction of movement of the media reversed to return the display portion to its viewing position, or the direction of the writehead reversed to return to the next scheduled section of media to be written. It is most advantageous to reverse direction when reversal of direction actually minimizes movement of the display media, writehead, or both.

Depending on the layout of the one or more media scroll, and the number and positioning of writeheads, writing can be done continuously or intermittently, wherein intermittent writing includes both random updates and timed rewrites of the display media.

In certain systems, a stationary and a moveable writehead can be employed, wherein random updates of portions of the display can be accomplished using the moveable writehead or stationary writehead, and rewriting of the entire display media can use the stationary writehead alone or in combination with the moveable writehead. Multiple writeheads, stationary or moveable, can be used such that each writehead is responsible for only a portion of the display media.

The invention has been described in detail with particular reference to certain preferred embodiments thereof, but it will be understood that variations and modifications can be effected within the spirit and scope of the invention.

PARTS LIST 1 view area
2 case
3 display media scroll
4 writehead
5 drive mechanism
6 battery
7 optical scanner
8 light source
11 media movement direction
12 writehead movement direction
20 media substrate
21 first conductor
22 display material
23 second conductor
24 second electrode
25 first electrode
26 first optical state
27 second optical state

The invention claimed is:

1. An electronically updatable, bistable display, comprising:
 a loop of bistable material having a view side including at least two viewing areas viewable from the same orientation with at least one viewable area, and a second side; and
 a writehead adjacent an area of the bistable material, wherein the loop of bistable material is movable relative to the writehead, and a second writehead is spaced apart from the writehead along the bistable material.

2. The display of claim 1, further comprising an optical scanner adjacent a second area of the bistable material.

3. The display of claim 2, wherein the optical scanner is movable relative to the loop of bistable material.

4. The display of claim 1, wherein the second side has at least one viewing area.

5. The bistable display of claim 1, wherein the writehead is adjacent an area of the view side of the bistable material.

6. The bistable display of claim 1, wherein the writehead is adjacent an area of the second side of the bistable material.

7. The display of claim 1, further comprising a power source.

8. The display of claim 1, wherein the writehead is wirelessly controlled.

9. The display of claim 1, further comprising at least one light source adjacent at least one portion of the loop of bistable material.

10. The display of claim 1, wherein the at least two viewing areas are viewable from a different orientation.

11. The display of claim 1, wherein the loop of bistable material moves and the writehead is fixed.

12. The display of claim 1, wherein the loop of bistable material is fixed, and the writehead moves.

13. The display of claim 1, wherein the loop of bistable material and the writehead both move relative to one another.

14. The display of claim 1, wherein the bistable material comprises liquid crystal material, magnetic material, electrophoretic material, electrochromic material, electrochemical material, or a combination thereof.

15. The display of claim 1, wherein at least a portion of the bistable material is transmissive.

16. The display of claim 1, wherein at least a portion of the bistable material is reflective.

17. The display of claim 1, wherein the second writehead is on the opposite side of the bistable material from the writehead.

18. The display of claim 1, wherein the loop has an exterior side and an interior side, and wherein the view side of the bistable material is on the exterior side of the loop.

19. A display, comprising:
   a loop of bistable material having a view side with at least one viewable area, and a second side; and
   a writehead adjacent the loop of bistable material, the loop of bistable material includes an exterior side and an interior side and is movable relative to the writehead, and the view side of the bistable material is on the interior side.

20. A display, comprising:
   at least two loops of bistable material, each loop of bistable material having at least one writehead, a view side with at least one viewable area, and a second side; and
   wherein each writehead is adjacent to an area of each corresponding loop of bistable material and each loop of bistable material is movable relative to its corresponding writehead.

21. A display, comprising:
   at least two loops of bistable material having a view side with at least one viewable area, and a second side; and
   at least one writehead adjacent an area of the bistable material, wherein the loop of bistable material is movable relative to the writehead and each writehead configured to write at least a portion of two or more loops of bistable material.

22. A method, comprising:
   electronically updating a bistable display comprising a loop of bistable material having a view side with at least two viewing areas by:
   forming an image on the at least two viewing areas viewable from the same orientation using a writehead adjacent an area of the bistable material, wherein a second writehead is spaced apart from the writehead along the bistable material.

23. The method of claim 22, wherein the forming the image includes moving the loop of bistable material relative to a stationary writehead.

24. The method of claim 22, wherein the forming the image includes moving the writehead relative to a stationary loop of bistable material.

25. The method of claim 22, wherein the forming the image includes moving the loop of bistable material and moving the writehead relative to one another.

26. The method of claim 22, comprising verifying the formed image using an optical scanner.

27. The method of claim 22, further comprising continuously updating the bistable display by moving the loop of bistable material continuously relative to the writehead to form one or more images on the loop of bistable material.

28. The method of claim 22, further comprising intermittently updating the bistable display by moving the loop of bistable material at intermittent intervals relative to the writehead to form one or more images on the loop of bistable material.

* * * * *